US009017458B2

(12) United States Patent
Mitchell et al.

(10) Patent No.: US 9,017,458 B2
(45) Date of Patent: Apr. 28, 2015

(54) METHOD OF CONCURRENTLY FILTERING PARTICLES AND COLLECTING GASES

(71) Applicant: Lawrence Livermore National Security, LLC, Livermore, CA (US)

(72) Inventors: Mark A. Mitchell, Dublin, CA (US); Annemarie Meike, Oakland, CA (US); Brian L. Anderson, Lodi, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 171 days.

(21) Appl. No.: 13/709,456

(22) Filed: Dec. 10, 2012

(65) Prior Publication Data

US 2014/0162346 A1    Jun. 12, 2014

(51) Int. Cl.
*B01D 53/02* (2006.01)
*B01D 46/00* (2006.01)
*B01D 53/04* (2006.01)

(52) U.S. Cl.
CPC ........ *B01D 46/0036* (2013.01); *B01D 53/0431* (2013.01); *B01D 2253/102* (2013.01); *B01D 2257/708* (2013.01); *B01D 2257/93* (2013.01)

(58) Field of Classification Search
CPC ........................................................ B01D 46/36
USPC .................................. 96/134, 138; 95/90, 148
See application file for complete search history.

(56) References Cited

U.S. PATENT DOCUMENTS

| | | | |
|---|---|---|---|
| 4,878,927 A * | 11/1989 | Margraf ........................... 55/302 |
| 5,171,335 A | 12/1992 | Kojima et al. | |
| 7,655,070 B1 * | 2/2010 | Dallas et al. ..................... 95/154 |
| 7,882,754 B2 * | 2/2011 | Suga et al. ................. 73/863.21 |
| 2011/0194982 A1 * | 8/2011 | Lee ............................... 422/120 |

* cited by examiner

*Primary Examiner* — Jason M Greene
*Assistant Examiner* — Karla Hawkins
(74) *Attorney, Agent, or Firm* — Eddie E. Scott (57) ABSTRACT

A system for concurrently filtering particles and collecting gases. Materials are be added (e.g., via coating the ceramic substrate, use of loose powder(s), or other means) to a HEPA filter (ceramic, metal, or otherwise) to collect gases (e.g., radioactive gases such as iodine). The gases could be radioactive, hazardous, or valuable gases.

25 Claims, 9 Drawing Sheets

FIG. 9

METHOD OF CONCURRENTLY FILTERING PARTICLES AND COLLECTING GASES

FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

CROSS-REFERENCE TO RELATED APPLICATIONS

U.S. patent application Ser. No. 13/618,830 filed Aug. 29, 2012 for Ceramic Filter with Nanofibers by the inventor in the present application, Mark A. Mitchell, and another inventor Jeffery John Haslam, discloses systems related to the present invention. U.S. patent application Ser. No. 13/689,672 filed Sep. 7, 2012 by Jeffery John Haslam for Radiological/Biological/Aerosol Removal Device discloses systems related to the present invention. The disclosures of U.S. patent application Ser. No. 13/618,830 filed Aug. 29, 2012 and U.S. patent application Ser. No. 13/689,672 filed Sep. 7, 2012 are incorporated herein in their entirety for all purposes by this reference.

BACKGROUND

1. Field of Endeavor

The present invention relates to filtering and more particularly to a method of concurrently filtering particles and collecting gases.

2. State of Technology

The conventional disposable High Efficiency Particulate Air (HEPA) filter system used today was originated during World War II when the Allies became concerned for the soldiers who were being exposed to dense chemical fog used for camouflage and/or chemical warfare. Research for breathing apparatus to filter the chemical fog began with creating an aerosol of minimal and uniform particle size to use for instrumentation calibration. The resulting material was dioctyl phthalate (DOP), a pure phthalic ester. The DOP testing method is still used today. An improved filter media consisting of finely ground asbestos and large diameter support fibers was introduced during the early 1950's. This filter media demonstrated a filtering efficiency of 99.97% and was replaced just a few years later during the mid-1950's with a material boasting of uniformity and higher efficiency. We know this material today as fiberglass. The fiberglass material also demonstrated a minimum filtering efficiency of 99.97%; this specification for HEPA has remained unchanged and is still used today.

Most air/gas filter units are constructed the same way—a continuous length of filter media is folded back and forth into pleats and corrugated separators are inserted between each fold. The assembly is then sealed into a rigid, open-faced rectangle. The components of a fabricated filter include: (1) extensively pleated filter medium (including a binder), (2) separators that provide air passages and keep adjacent pleats apart, (3) a rigid filter case that encloses and protects the fragile filter medium, (4) sealants used to bond the filter pack (consisting of the assembled pleated medium and separators) to the filter case and to eliminate leak paths between filter pack components, and (5) gaskets attached to the filter case on one or both open faces to provide an airtight seal between the filter and the mounting frame.

The conventional system used today to capture/collect gases is scrubbers or activated charcoal/carbon filters. Activated carbon is used to trap iodine releases from a nuclear reactor. Activated carbon, often impregnated with iodine or sulfur, is also widely used to trap mercury emissions from coal-fired power stations, medical incinerators, and from natural gas at the wellhead. Activated carbon is also used to capture volatile organic compounds (VOCs).

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a process/method of concurrently filtering particles and collecting gases. Materials are be added (e.g., via coating the ceramic substrate, use of loose powder(s), use of pellets, or other means) to a HEPA filter (ceramic, metal, or otherwise) to collect gases (e.g., radioactive gases such as iodine). The gases could be radioactive, hazardous, unpleasant (e.g., VOCs), environmentally regulated (e.g., $CO_2$), or valuable gases. Materials can include porous ceramic, non-ceramic, polymeric, zeolite, natural, and man-made materials. The pore size can vary. Materials can be coated (by a variety of approaches), loosely packed, conglomerated, pelletized, packaged (e.g, in sealed or unsealed package). Gas collecting materials can be located downstream or upstream of particulate filtration. Gas collecting materials can be cooled or heated. Gas collecting materials can have an electrical charge applied to them. The present invention also provides incorporating the "absorptive" and/or "adsorptive" material as a fiber(s) or particulate(s) on fiber(s) of the filter as an extension of the concept. The present invention will allow the use of 1 filter or 1 type of filter in place of current nuclear reactor practices of using both particle filters (e.g., HEPA filters) and carbon filters (e.g., for iodine capture). The present invention has use in an overall gas stream system and can be used in military, nuclear, bio-tech (including pharmaceutical), chemical (including powder, wet-chemistry, and semi-conductor industries) systems, and power (e.g., coal).

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The present invention provides an apparatus, process, system, and method of concurrently filtering particles and collecting gases. Materials are added (e.g., via coating the ceramic substrate, use of loose powder(s), pellets, or other means) to a HEPA filter (ceramic, metal, or otherwise) to collect gases (e.g., radioactive gases such as iodine). The gases could be radioactive, hazardous, or valuable gases. The present invention will allow the use of 1 filter or 1 type of filter in place of current nuclear reactor practices of using both particle filters (e.g., HEPA filters) and carbon filters (e.g., for iodine capture).

Prior Art Filter System

Figure 1:
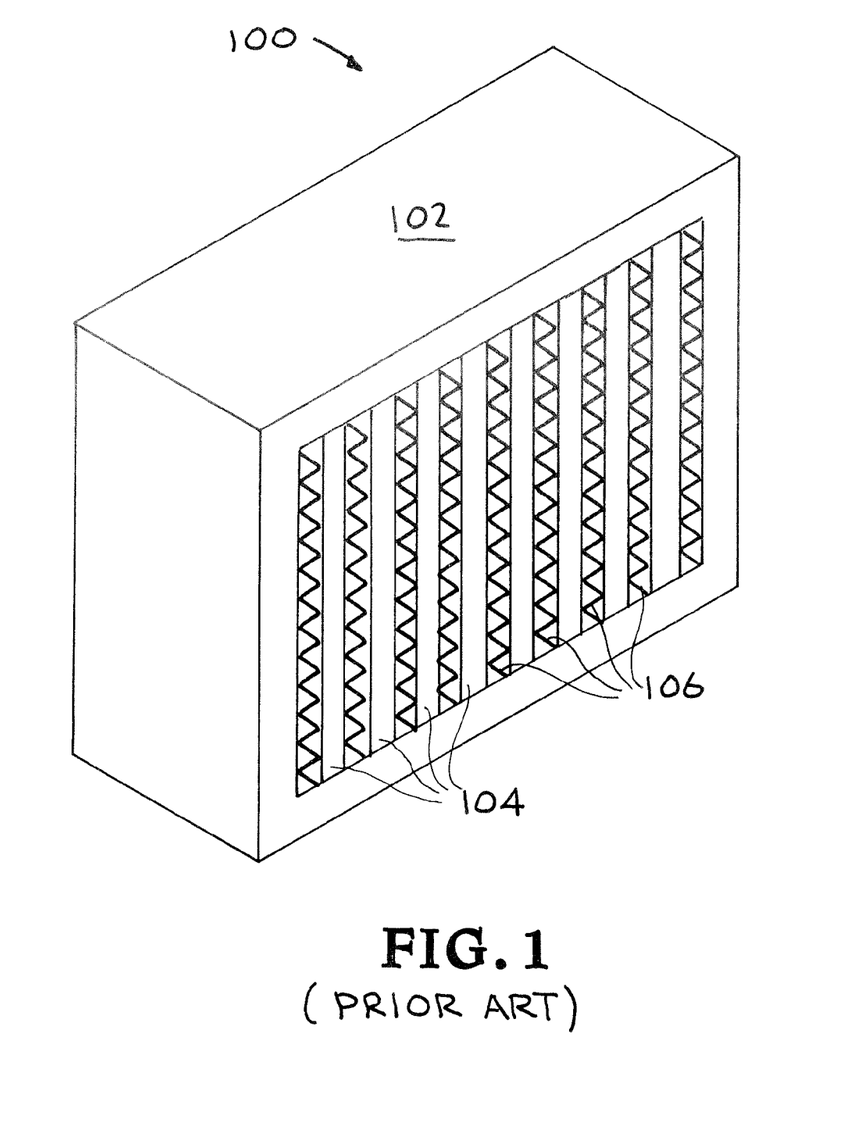
FIG. 1 illustrates a prior art filter system.

Referring now to the drawings and in particular to FIG. 1, a prior art filter system is illustrated. The prior art filter system is designated generally by the reference numeral 100. The prior art filter system 100 is a High-Efficiency Particulate Air or HEPA type of air filter. Filters meeting the HEPA standard have many applications including use in medical facilities, automobiles, aircraft, and homes.

The prior art filter system 100 provides a filter material 104 within a filter unit body or frame 102. The filter unit body 102 provides a housing that contains a continuous sheet of filter material 104. The continuous sheet of filter material 104 is positioned and maintained within the filter unit body 102 by individual separators 106.

Limitations of the Prior Art Filter System

The prior art filter system 100 works well in the removal aerosol particles and has desirable characteristics in low pressure drop with high filtration efficiency. The prior art filter system 100 can provide protection from biological and radiological aerosol attack by capturing radiological or biological or aerosol particles. The prior art filter system 100 is effective in removing particles but is ineffective in removing poison gases and hazardous gases. The prior art filter system 100 does not provide a system for capturing gases.

Improved Filter System

Referring now to FIGS. 2A, 2B, 2C, and 2D, an embodiment of the filter system of the present invention is illustrated. The filter system is designated generally by the reference numeral 200. The filter system 200 provides a filter array within a filter unit body 202. The filter unit body 202 is a housing that contains a multiplicity of tubular filter elements 204 housed in the filter unit body 202. The tubular filter elements 204 are attached to the bottom of the filter unit body 202.

The tubular filter elements 204 are closed at the top and open at the bottom. This is illustrated by the closed tops 204a shown in FIGS. 2A, 2B, 2C, and 2D and by the open bottoms of the tubular filter elements 204 shown in FIGS. 2B, 2C, and 2D. The open bottoms of the tubular filter elements 204 provide the tubular filter elements 204 with openings to allow fluid flow through the open bottom. When the filter system is operating with fluid flow into the top of the filter unit housing 202 the fluid to be filtered passes through the filter material that makes up the tubular filter elements 204 and passes through the openings in the bottom of the tubular filter elements 202 attached to the filter unit body 202. The fluid to be filtered can be directed either through the tubular filter elements 202 and out the bottom or, alternatively, in the bottom and through the tubular filter elements 202 and out the top of the filter unit housing 202. This is illustrated by the double headed arrows 206.

Figure 2A:
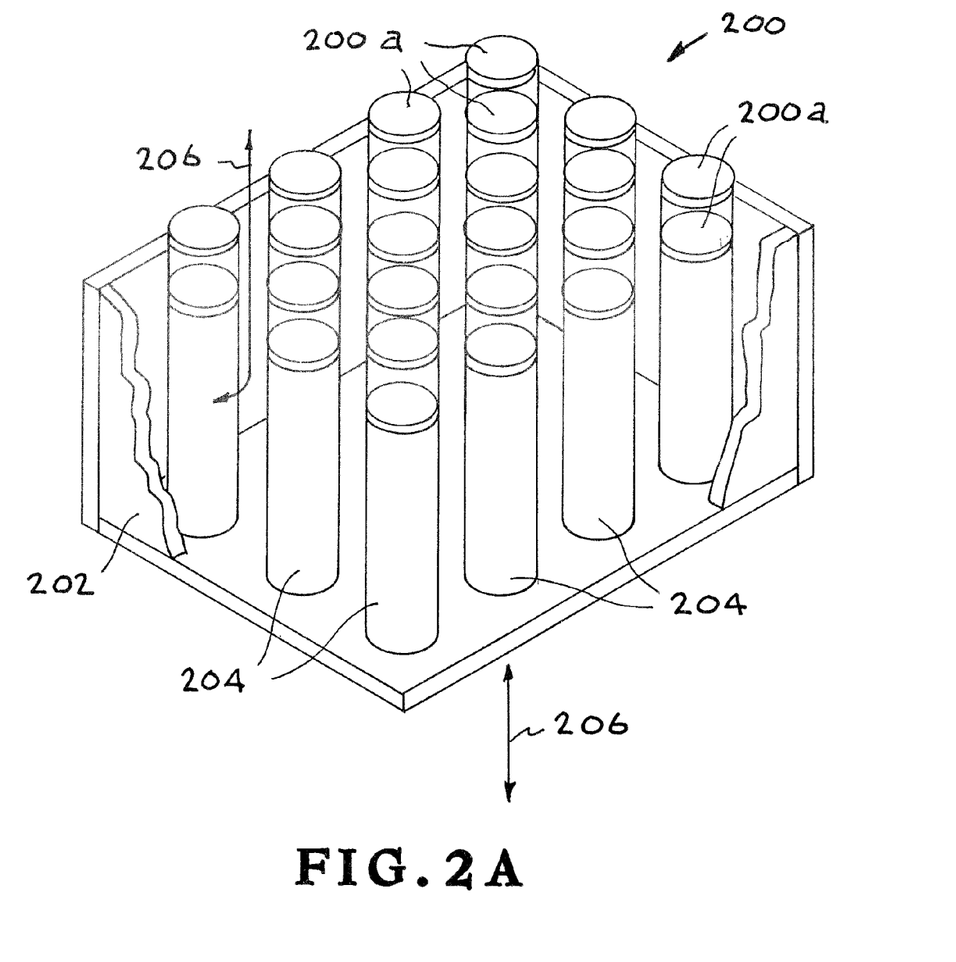
FIGS. 2A, 2B, 2C, and 2D illustrate an embodiment of the filter system of the present invention.
Figure 2B:
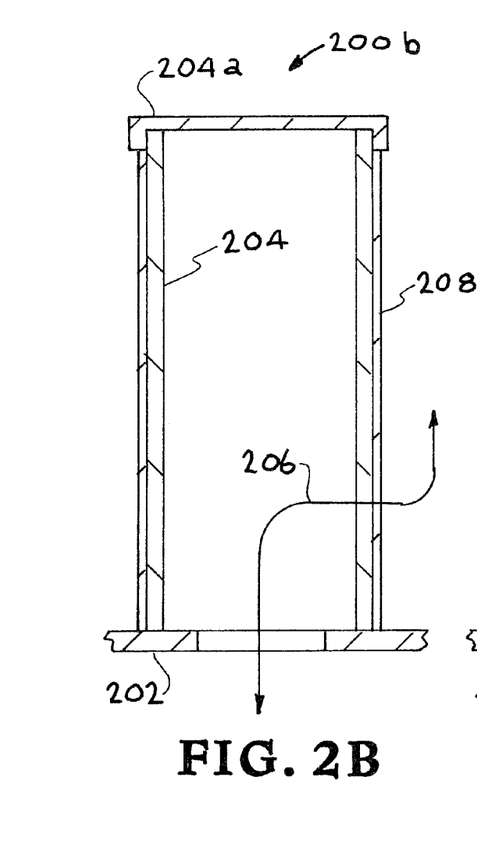
Figure 2C:
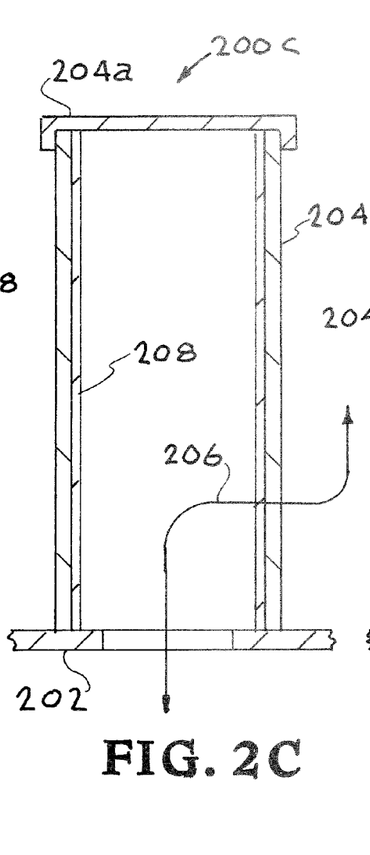
Figure 2D:
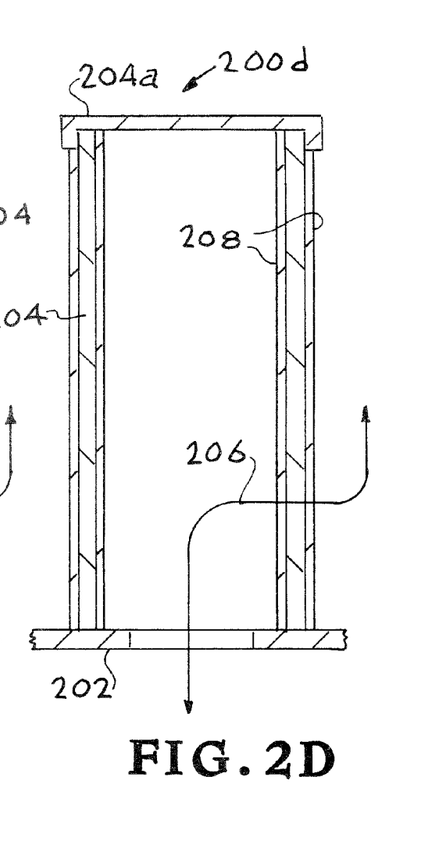

The medium being filtered passes through filter materials proximate the tubular filter elements 204. As shown in FIGS. 2B, 2C, and 2D, the filter system 200b includes a tubular filter element 204 that filters the medium being filtered as it passes through the sides of the tubular filter element 204. The sides of the tubular filter element 204 are made of a filter material that removes radiological or biological or aerosol particles.

As illustrated in FIGS. 2B, 2C, and 2D, layers of material 208 are positioned on the outside of the tubular filter element 204, on the inside of the tubular filter element 204, and on both the outside and inside of the tubular filter element 204. The material 208 is a material that removes and/or collects gases. The gases can be radioactive (e.g., iodine), unpleasant (e.g., VOCs), environmentally regulated (e.g., $CO_2$), hazardous (e.g., mercury vapor), or valuable gases (e.g., $^3$He and tritium). Materials for removing and/or collecting gases are provided in the material 208 via coating a substrate other means to remove or collect the gases. These may include natural enzymes, zeolites, or synthetic molecules that may catalyze the chemistry of gases (e.g., $CO_2$) and/or capture/collect the gas. The filter system 200 can provide protection from a terrorist attack by removing biological and radiological aerosol particles and removing poisonous gases.

As shown in FIG. 2B, a layer of material 208 is positioned on the outside of the tubular filter element 204. The material 208 is a material that removes and/or collects gases. The gases can be radioactive, hazardous, or valuable gases. Materials for removing and/or collecting gases are provided in the material 208 via coating a substrate other means to remove or collect the gases. The filter system 200b can provide protection from a terrorist attack by removing biological and radiological aerosol particles and removing poisonous gases.

The filter system 200b also has use in the exhaust ventilation systems of industrial and scientific complexes requiring particulate and chemical free air in order to produce more sensitive products such as microelectronic components, photoproducts, drugs and dairy products.

As shown in FIG. 2C, the filter system 200c includes a tubular filter element 204 that filters the medium being filtered as it passes through the sides of the tubular filter element 204. The sides of the tubular filter element 204 are made of a filter material that removes radiological or biological or aerosol particles.

A layer of material 208 is positioned on the inside of the tubular filter element 204. The material 208 is a material that removes and/or collects gases. The gases can be radioactive, hazardous, or valuable gases. Materials for removing and/or collecting gases are provided in the material 208 via coating a substrate other means to remove or collect the gases. The filter system 200c can provide protection from a terrorist attack by removing biological and radiological aerosol particles and removing poisonous gases.

As shown in FIG. 2D, the filter system 200d includes a tubular filter element 204 that filters the medium being filtered as it passes through the sides of the tubular filter element 204. The sides of the tubular filter element 204 are made of a filter material that removes radiological or biological or aerosol particles.

Layers of material 208 are positioned on the inside and on the outside of the tubular filter element 204. The material 208 is a material that removes and/or collects gases. The gases can be radioactive, hazardous, or valuable gases. Materials for removing and/or collecting gases are provided in the material 208 via coating a substrate other means to remove or collect the gases.

The filter systems 200, 200b, 200c, and 200d provide protection from a terrorist attack by removing biological and radiological aerosol particles and removing poisonous gases. The filter systems also have use in the chemical processing/separations systems, and/or exhaust ventilation systems, of industrial and scientific complexes requiring particulate and chemical free air in order to produce more sensitive products such as microelectronic components, photoproducts, drugs and dairy products. Uses for HEPA filters in hazardous containment applications have increased also, and they are more routinely used on the exhaust side of bio-hazard hoods, animal disease research laboratories and whenever airborne carcinogens must be controlled." The filter systems 200, 200b, 200c, and 200d also have use in removing/capturing iodine and other radioactive, hazardous, or valuable gas capture.

For example, the filter systems 200, 200b, 200c, and 200d also have use in the storage systems associated with the storage of spent nuclear fuel. Dispersible from spent fuel is the fines (small particles of spent fuel material that gets released from cladding breaches) and crud (corrosions products on the outside of the spent fuel from being in the spent fuel cooling pool, and has a radioactive constituent primarily of $^{60}$Co from the activated metal). The filter could be used to trap the particles (i.e., crud and fines) and capture volatiles (e.g., iodine).

For example, as environmental regulations become tighter, the filter systems 200, 200b, 200c, and 200d have use in remove airborne particulate and mercury vapor from coal power plants. For example, they also have use in biopharmaceutical, medical, sewage and other industrial applications involving unpleasant, regulated, and/or hazardous materials as a means of pollution control.

Filter System with Gas Collecting Materials

Figure 3:
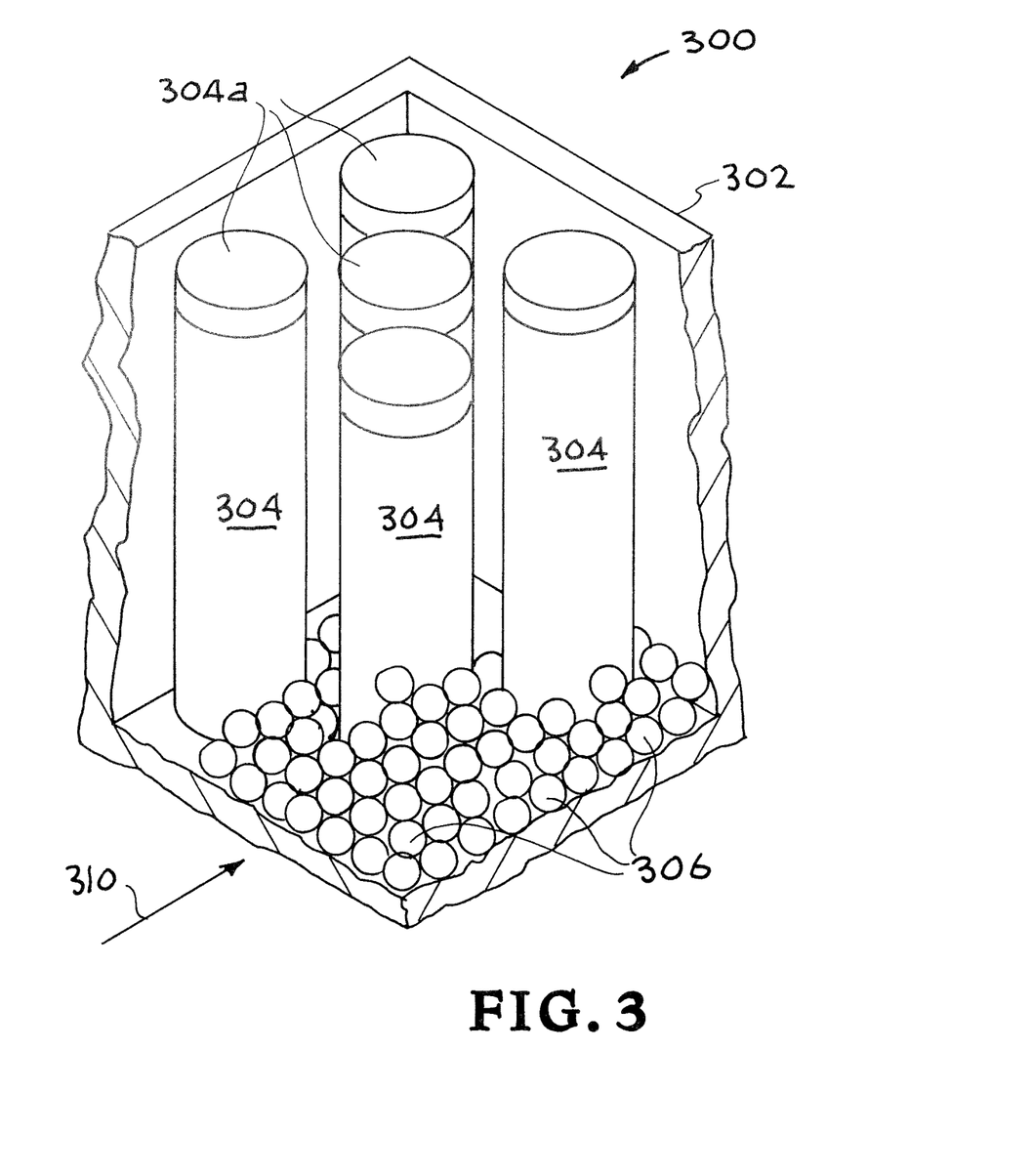
FIG. 3 illustrates another embodiment of a filter system of the present invention.

Referring now to FIG. 3, another embodiment of a filter system of the present invention is illustrated. The filter system is designated generally by the reference numeral 300. The filter system 300 includes a filter unit body 302. An array of tubular filter elements 304 are contained in the filter unit body 302. The tubular filter elements 304 are closed at the top and open at the bottom. The tubular filter elements 304 are closed at the top as illustrated by the closed tops 304a. The medium to be filtered is illustrated by the arrow 310. These may include natural enzymes, zeolites, or synthetic molecules that may catalyze the chemistry of gases (e.g., $CO_2$) and/or capture/collect the gas. The medium being filtered passes through filter materials proximate the tubular filter elements 304.

As illustrated in FIG. 3, the filter system 300 is used for concurrently filtering particles and collecting gases. Materials for collecting gases are added by the use of loose powder(s), pellets, or other materials 306 located proximate the tubular filter elements 304. The gas collecting materials can be located downstream or upstream of the particulate filtration provided by the tubular filter elements 304. Gas collecting materials can be cooled or heated. Gas collecting materials can have an electrical charge applied to them. The filter system 300 also can utilize the incorporation of "absorptive" or "adsorptive" material as a fiber(s) or particulate(s) on fiber(s) of the filter.

The filter systems in FIG. 3 also has use in the chemical processing/separations systems, and/or exhaust ventilation systems, of industrial and scientific complexes requiring particulate and chemical free air in order to produce more sensitive products such as microelectronic components, photoproducts, drugs and dairy products. Uses for HEPA filters in hazardous containment applications have increased also, and they are more routinely used on the exhaust side of bio-hazard hoods, animal disease research laboratories and whenever airborne carcinogens must be controlled. The filter systems 200a, 200b, and 200c also have use in removing/capturing iodine and other radioactive, hazardous, or valuable gas capture.

For example, as environmental regulations become tighter, the filter systems FIG. 3 has use in remove airborne particulate and mercury vapor from coal power plants. They also have use in biopharmaceutical, medical, sewage and other industrial applications involving unpleasant, regulated, and/or hazardous materials as a means of pollution control.

Figure 4:
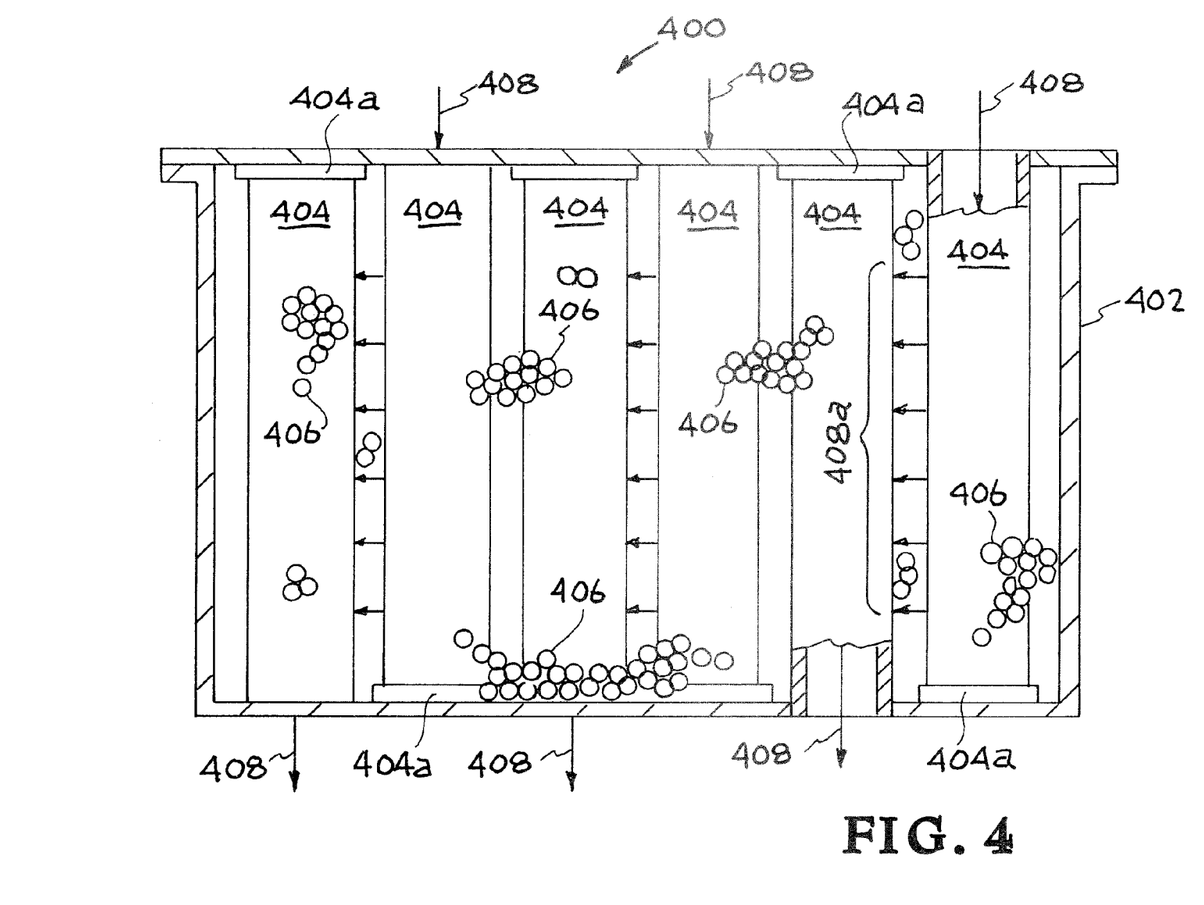
FIG. 4 illustrates yet another embodiment of the filter system of the present invention.

Referring now to FIG. 4, another embodiment of a filter system of the present invention is illustrated. The filter system is designated generally by the reference numeral 400. The filter system 400 includes a filter unit body 402 and an array of tubular filter elements 404 contained in the filter unit body 402. The tubular filter elements 404 are closed at the top and open at the bottom. The tubular filter elements 404 are closed at the top as illustrated by the closed tops 404a.

The difference in the filter system 400 from the filter system 300 shown in FIG. 3 is that some of the tubular filter elements 404 extend from one side of the filter unit body 402 and the other tubular filter elements 404 extend from the other side of the filter unit body 402. As illustrated in FIG. 4 the tubular filter elements 404 on the right side of the filter unit body 402 have their open ends on the outside of the right side of the filter unit body 402. The tubular filter elements 404 on the left side of the filter unit body 402 have their open ends on the outside of the left side of the filter unit body 402. Gases entering the tubular filter elements 404 from the right side are illustrated by the arrows 408 on the right side of the filter unit body 402. The gasses 408 exit the sides of the right side tubular filter elements 404 and enter the side of the left side tubular filter elements 404 as illustrated by the dotted lines and arrows 408. The gasses 408 pass through the left tubular filter elements and exit the left side open ends as illustrated by the arrow 408 on the left side of the filter unit body 402. The second filter tube may the same as the first filter tube, or may be different—the first filter tube may be of a lower filtration efficiency and the second filter tube may be of a higher filtration efficiency, e.g., coated. Burning embers (that enter the filter or are produced by combustion, pyrolysis, or thermal breakdown of the gas capture material 406) would thus be trapped inside the filter.

The medium to be filtered is illustrated by the arrows 408. The medium being filtered passes through filter materials that make up the tubular filter elements 404.

As illustrated in FIG. 4 the filter system 400 is used for concurrently filtering particles and collecting gases. Materials for collecting gases are added by the use of loose powder(s) or other materials 406 located proximate the tubular filter elements 404. The gas collecting materials can be located downstream or upstream of the particulate filtration provided by the tubular filter elements 404. Gas collecting materials can be cooled or heated. Gas collecting materials can have an electrical charge applied to them. The filter system 400 also can utilize the incorporation of "absorptive" material as a fiber(s) or particulate(s) on fiber(s) of the filter.

Figure 5:
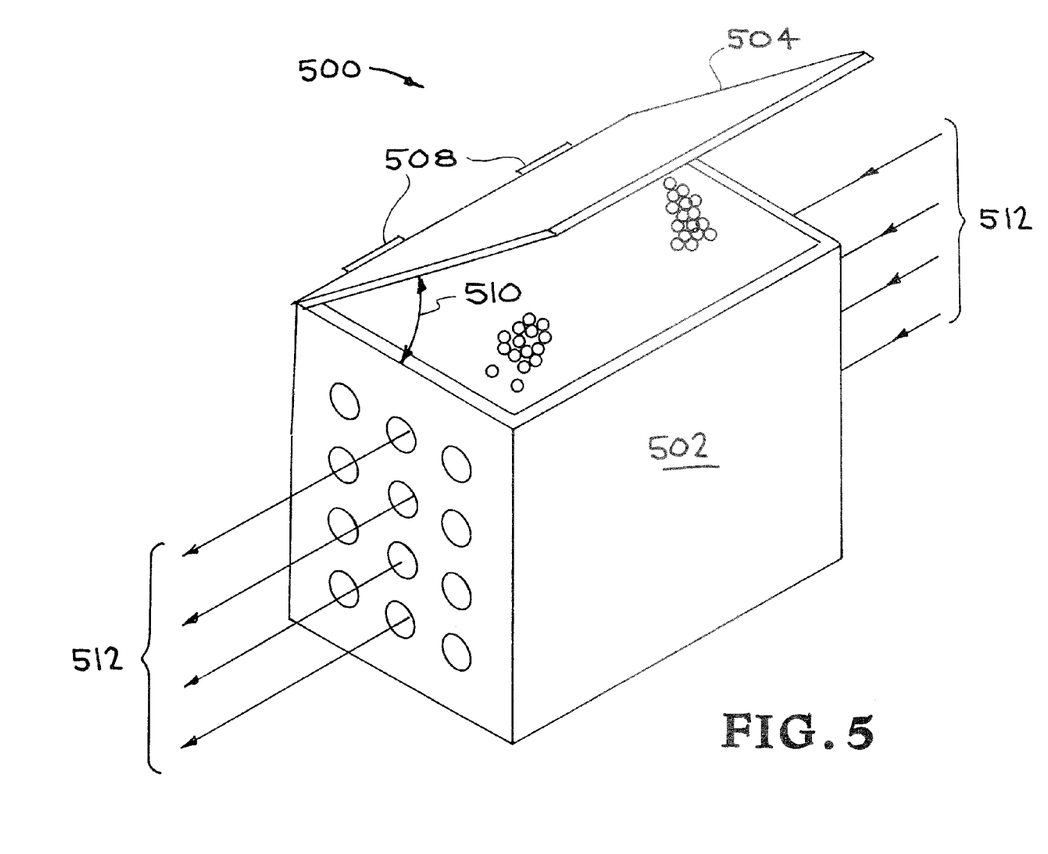
FIG. 5 illustrates another embodiment of the filter system of the present invention.

Referring now to FIG. 5, another embodiment of a filter system of the present invention is illustrated. The difference from filter systems illustrated in FIGS. 3 and 4 is that a side or top 504 of the filter unit body housing 502 includes a seam with a hinge, buckle, or other sealing mechanism 508 such that the lid 504 of the filter unit body housing 502 can easily be filled with, or emptied of, the gas capture material.

Gases entering the tubular filter elements from the right side are illustrated by the arrows 512 on the right side of the filter unit body 502. The gasses exit the sides of the right side tubular filter elements and enter the side of the left side tubular filter elements. The gasses pass through the left tubular filter elements and exit the left side open ends as illustrated by the arrow 512 on the left side of the filter unit body 502.

As illustrated in FIG. 5 the filter system 500 is used for concurrently filtering particles and collecting gases. Materials for collecting gases are added by the use of loose powder(s) or other materials located proximate the tubular filter elements. The side or top 504 of the filter unit body housing 502 includes the hinge, buckle, or other sealing mechanism 508 such that the lid 504 of the filter unit body housing 502 can easily be filled with, or emptied of, the gas capture material.

Gas Collecting and Filter Cleaning

Figure 6:
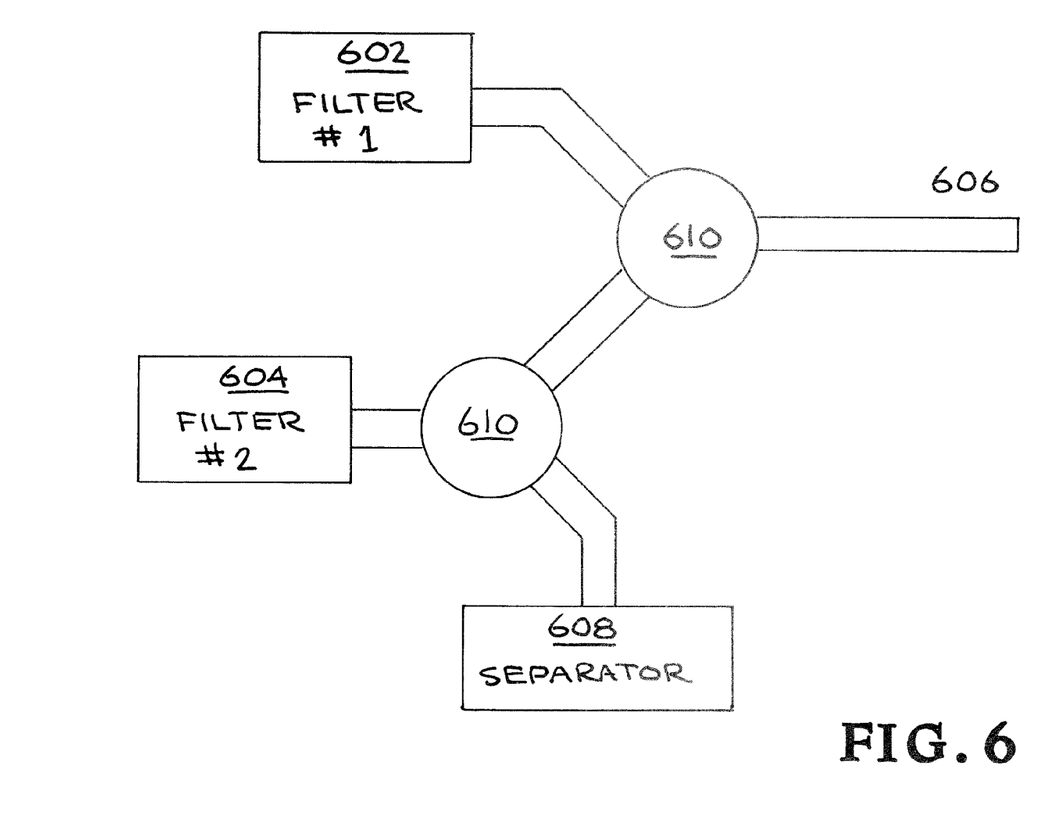
FIG. 6 illustrates another embodiment of the filter system of the present invention.

Referring now to FIG. 6, another embodiment of a filter system of the present invention is illustrated. This embodiment of a filter system of the present invention is designated generally by the reference numeral 600. The filter system 600 includes two filter units 602 and 604. This allows one filter unit to be active while the other filter unit is being processed. A ventilation system 606 is used to selectively connect the filter units 602 and 604 to a system 608 for removing the captured gas and cleaning the filter unit. A diverting system 610 operatively connects the filter units 602 and 604 to the system 608 for removing the captured gas and cleaning the filter unit.

The filter system 600 can be used in such a manner that the captured gas can be released from the gas capturing material and collected. The release mechanism can be physical (e.g., vibration, shock), thermal (heating or cooling), chemical, pressure, backpulse, washing, or otherwise. The captured gas can then be collected in a concentrated manner (e.g., by a cyclone separator) for easier removal from the system for waste treatment, waste disposal, or harvesting (in the case of a valuable gas). For example, mercury vapor can be released from gas capture material, collected, and then disposed of as hazardous waste. The filter may be used in conjunction with diesel powerplants (e.g., giant diesel engines that run on dirty diesel fuel) to meet stringent environmental standards (e.g. at ports, at remote mine locations). The filter is then cleaned (e.g., washed or backpulsed) in situ or ex situ. The filter material may be removed to be cleaned ex situ. Such filters make diesel more competitive against natural gas by aiding the regulatory approval process (e.g., because then getting the permits for diesel would be easier).

Figure 7:
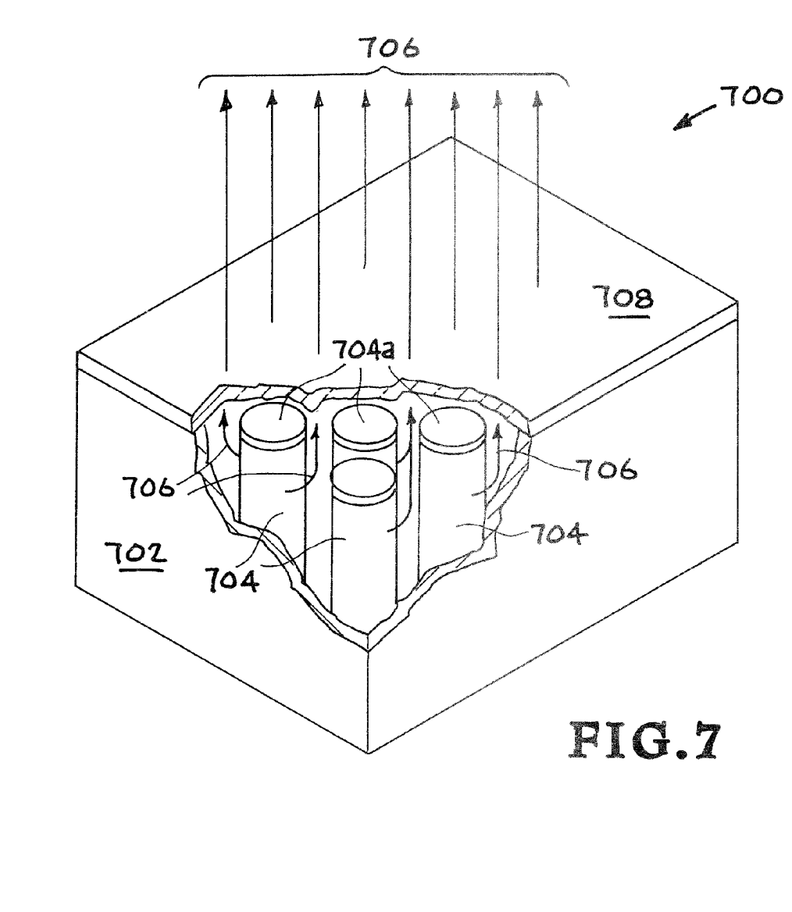
FIG. 7 illustrates another embodiment of the filter system of the present invention.

Referring now to FIG. 7, another embodiment of a filter system of the present invention is illustrated. This embodiment of a filter system of the present invention is designated generally by the reference numeral 700. The difference between filter system 700 and the other previously describe filter systems is in filter system 700 all of the tubes 704 are closed at one end and open at the end, such that one side of the filter has tubes with open ends and the other side is composed of a porous plate, wire mesh, porous ceramic material, or porous metal (e.g., sintered metal filter). In this variation, gases exiting the filter must pass through said porous plate, wire mesh, porous ceramic material, or porous metal (e.g., sintered metal filter). This side of the filter may itself be composed of filtering material which may have of a higher filtration efficiency, e.g., coated. Burning embers (that enter the filter or are produced by combustion, pyrolysis, or thermal breakdown of the gas capture material) would thus be trapped inside the filter.

Layer Filter

Figure 8:
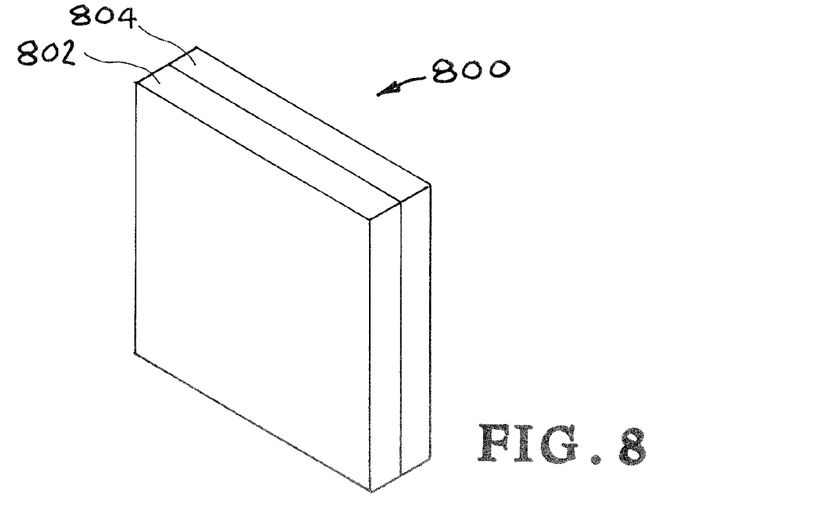
FIG. 8 illustrates another embodiment of the filter system of the present invention.

Referring now to FIG. 8, yet another embodiment of a filter system of the present invention is illustrated. The filter system is designated generally by the reference numeral 800. The filter system 800 provides protection from biological, radiological, and poison gas attack. The air filter 800 includes two separate filters, filter 802 and filter 804.

The filter 802 is a filter that removes radiological or biological or aerosol particles. The filter 814 is made of a filter material that removes the radiological or biological or aerosol particles. For example, the filter material can be a filter material that is made of nanofibers. The material can be ceramic nanofibers. The material can be nanofibers with a diameter that is within the range of one nanometer to two hundred nanometers. The material can be a material that includes nanofibers with a diameter that is within the range of five nanometers to two hundred nanometers. The material can be a material having a diameter that is larger than two hundred nanometers.

The filter 804 is a filter that removes poison gas. The material can be a coating a substrate other means to remove or collect the gases. The filter 804 can provide protection from a terrorist attack by removing poisonous gases.

Replaceable Air Filter

Figure 9:
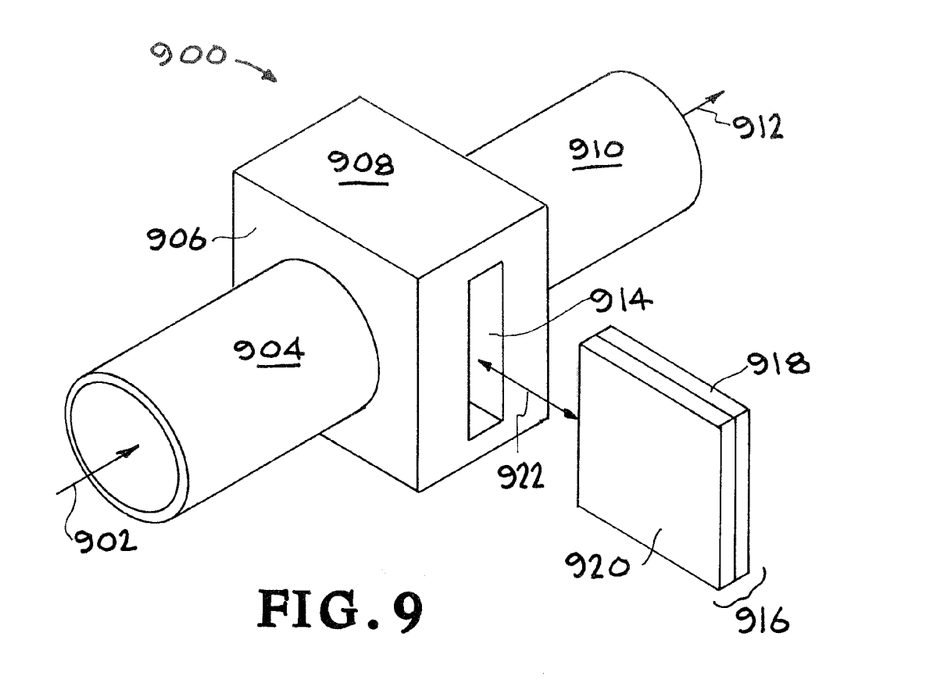
FIG. 9 illustrates yet another embodiment of the filter system of the present invention.

Referring to FIG. 9, another embodiment of a filter system is illustrated. The filter system is designated generally by the reference numeral 900. The filter system 900 provides an air filter for existing buildings, vehicles, arenas, and other enclosed airspaces. The existing air ducts 904 and 910 are part of the building's, vehicle's, arenas' or other enclosed air space's air circulation system. The air ducts 904 and 910 are connected to a plenum 908 having an opening 914 for replacing the air filters. The replacement of the prior art air filter is represented by the double headed arrow 922. The opening 914 generally has a door or removable panel that provides access to the opening 914.

The filter 920 is a filter that removes radiological or biological or aerosol particles. The filter 920 is made of a filter material that removes the radiological or biological or aerosol particles. For example, the filter material can be a filter material that is made of nanofibers. The material can be ceramic nanofibers. The material can be nanofibers with a diameter that is within the range of one nanometer to two hundred nanometers. The material can be a material that includes nanofibers with a diameter that is within the range of five nanometers to two hundred nanometers. The material can be a material having a diameter that is larger than two hundred nanometers.

The filter 918 is a filter that removes poison gas. The material can be a coating a substrate other means to remove or collect the gases. The filter 918 can provide protection from a terrorist attack by removing poisonous gases.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A filter apparatus for concurrently removing particles from a fluid and removing gases from the fluid, comprising:
   a filter unit body housing, said filter unit body housing forming an enclosure;
   at least one opening in said filter unit body housing;
   at least one tubular filter element positioned in said enclosure of said filter unit body housing,
   said at least one tubular filter element having a tubular side, an internal passage, a closed top, and an open bottom wherein said open bottom is positioned over said at least one opening in said filter unit body housing;
   a filter material associated with said tubular side of said at least one filter element that removes the particles from the fluid, when the fluid passes through said filter material; and
   a gas removing material in said enclosure of said filter unit body housing that removes the gases from the fluid as the fluid passes through said enclosure.

2. The filter apparatus for concurrently removing particles and gases from a fluid of claim 1 wherein said filter material is a filter material that includes nanofibers.

3. The filter apparatus for concurrently removing particles and gases from a fluid of claim 1 wherein said filter material is a filter material that removes radiological aerosol particles.

4. The filter apparatus for concurrently removing particles and gases from a fluid of claim 1 wherein said filter material is a filter material that removes biological aerosol particles from the fluid.

5. The filter apparatus for concurrently removing particles and gases from a fluid of claim 1 wherein said gas removing material that removes the gases from the fluid includes natural enzymes.

6. The filter apparatus for concurrently removing particles and gases from a fluid of claim 1 wherein said gas removing material that removes the gases from the fluid includes zeolites.

7. The filter apparatus for concurrently removing particles and gases from a fluid of claim 1 wherein said gas removing material that removes the gases from the fluid includes synthetic molecules that capture or collect the gases.

8. The filter apparatus for concurrently removing particles and gases from a fluid of claim 1 further comprising an access unit for providing access to said enclosure of said filter unit body housing.

9. The filter apparatus for concurrently removing particles and gases from a fluid of claim 1 further comprising a system for removing the gases from said gas removing material that removes the gases from the fluid.

10. The filter apparatus for concurrently removing particles and gases from a fluid of claim 1 further comprising a system for cleaning said filter material associated with said tubular side of said at least one element that removes the particles from the fluid.

11. A filter apparatus for concurrently removing particles from a fluid and removing gases from the fluid, comprising:
    a filter unit body housing, said filter unit body housing forming an enclosure;
    a first opening in said filter unit body housing;
    a second opening in said filter unit body housing;
    a first tubular filter element positioned in said enclosure of said filter unit body housing, said first tubular filter element having a first tubular side, a first internal passage, a first closed top, and a first open bottom wherein said first open bottom is positioned over said first opening in said filter unit body housing;
    a second tubular filter element positioned in said enclosure of said filter unit body housing, said second tubular filter element having a second tubular side, a second internal passage, a second closed top, and a second open bottom wherein said second open bottom is positioned over said second opening in said filter unit body housing;
    additional tubular filter elements positioned in said enclosure of said filter unit body housing, said additional tubular filter elements having additional tubular sides, additional internal passages, additional closed tops, and additional open bottoms wherein said additional open bottoms are positioned over said additional openings in said filter unit body housing;
    a first filter material associated with said first tubular side of said first tubular filter element that removes the particles from the fluid; when the fluid passes through said first filter material;
    a second filter material associated with said second tubular side of said second tubular filter element that removes the particles from the fluid when the fluid passes through said second filter material;
    additional filter materials associated with said additional tubular sides of said additional tubular filter elements that remove the particles from the fluid when the fluid passes through said additional filter materials; and
    a gas removing material in said enclosure of said filter unit body housing that removes the gases from the fluid as the fluid passes through said enclosure.

12. The filter apparatus for concurrently removing particles and gases from a fluid of claim 11 wherein said filter material is a filter element that includes nanofibers.

13. The filter apparatus for concurrently removing particles and gases from a fluid of claim 11 wherein said gas removing material that removes the gases from the fluid includes natural enzymes.

14. The filter apparatus for concurrently removing particles and gases from a fluid of claim 11 wherein said gas removing material that removes the gases from the fluid includes zeolites.

15. The filter apparatus for concurrently removing particles and gases from a fluid of claim 11 wherein said gas removing material that removes the gases from the fluid includes synthetic molecules that capture or collect the gases.

16. The filter apparatus for concurrently removing particles and gases from a fluid of claim 11 further comprising an access unit for providing access to said enclosure of said filter unit body housing.

17. The filter apparatus for concurrently removing particles and gases from a fluid of claim 11 further comprising a system for removing the gases from said gas removing material that removes the gases from the fluid.

18. The filter apparatus for concurrently removing particles and gases from a fluid of claim 11 further comprising a system for cleaning said filter material that removes the particles from the fluid.

19. A method of concurrently filtering particles and removing gases from a fluid, comprising the steps of:
   providing a filter unit body housing that forms an enclosure with at least one opening in said filter unit body housing;
   providing at least one tubular filter element in said enclosure of said filter unit body housing, wherein said a least one tubular filter element has a tubular side, an internal passage, a closed top, and an open bottom wherein said open bottom is positioned over said at least one opening in said filter unit body housing;
   providing a filter material associated with said tubular side of said at least one filter element; and
   providing a gas removing material in said enclosure of said filter unit body housing;
   directing the fluid through said at least one filter element and said filter material thereby removing the particles from the fluid, and
   directing the fluid to said gas removing material in said enclosure of said filter unit body housing thereby removing the gases from the fluid.

20. The method of concurrently filtering particles and removing gases from a fluid of claim 19 wherein said step of directing the fluid through said at least one filter element and said filter material thereby removing the particles from the fluid comprises directing the fluid through a filter material that includes nanofibers.

21. The method of concurrently filtering particles and removing gases from a fluid of claim 19 wherein said step of directing the fluid through said gas removing material includes directing the fluid through zeolites.

22. The method of concurrently filtering particles and removing gases from a fluid of claim 19 wherein said step of directing the fluid through said gas removing material includes directing the fluid through natural enzymes.

23. The method of concurrently filtering particles and removing gases from a fluid of claim 19 wherein said step of directing the fluid through said gas removing material includes directing the fluid through natural synthetic molecules that capture or collect the gases.

24. The method of concurrently filtering particles and removing gases from a fluid of claim 19 further comprising the step of removing the gases from said gas removing material that removes the gases from the fluid.

25. The method of concurrently filtering particles and removing gases from a fluid of claim 19 further comprising the step of cleaning said filter material.

* * * * *